United States Patent Office.

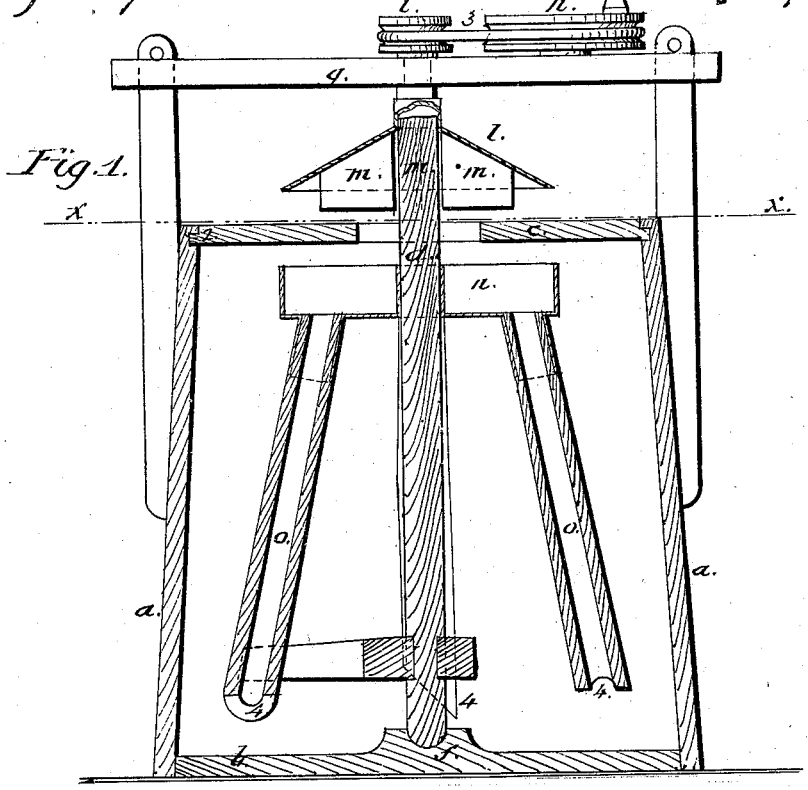
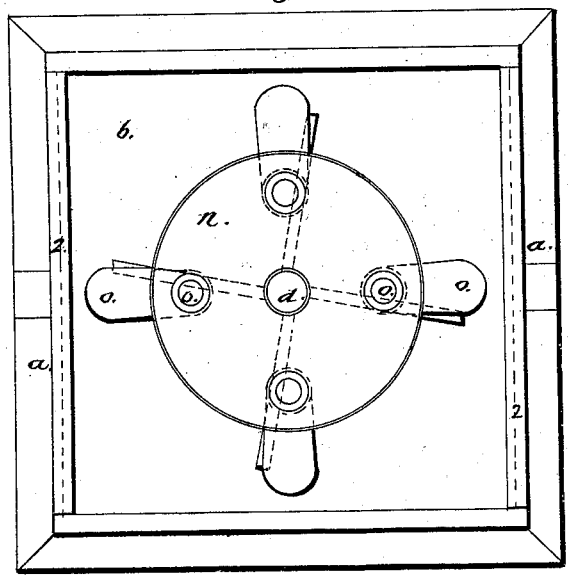

ADDISON MOE, OF PLAINFIELD, NEW JERSEY.

Letters Patent No. 93,827, dated August 17, 1869.

IMPROVEMENT IN CHURNS.

The Schedule referred to in these Letters Patent and making part of the same.

*To all whom it may concern:*

Be it known that I, ADDISON MOE, of Plainfield, in the county of Union, and State of New Jersey, have invented and made a new and useful Improvement in Churns; and I do hereby declare the following to be a full, clear, and exact description of the said invention, reference being had to the annexed drawing, making part of this specification, wherein—

Figure 1 is a vertical section of the said churn, and

Figure 2 is a plan of the same, below the line $x\ x$, the covers being removed.

Similar marks of reference denote the same parts.

The object of this invention is to produce violent agitation of the milk or cream, and, at the same time, supply air into said cream, to aid in the separation of the particles of butter.

The cream is prevented from splashing out at the top of the churn, and a current of air is produced at the same point, to bring fresh atmosphere to the churn, and to prevent dust or foreign substances falling into the mouth of the churn.

In the drawing—

$a\ a$ are the sides, and $b$, the bottom of the churn, that is here shown as rectangular or slightly pyramidal.

The top of the churn is fitted with covers, $c$, sliding in grooves, 2 2. (See fig. 1.)

Each of these covers extends half across the churn, and is provided with a semicircular notch, so as to form an opening into the churn, around the vertical spindle $d$.

$f$ is a step, at the bottom of the churn, for the spindle $d$, and $g$ is a cross-bar, supporting the upper end of said spindle and the hand-wheel $h$, by means of which, and a belt, 3, to the pulley $i$, the spindle, and parts carried by it, can be rapidly rotated.

The spindle $d$ carries the inclined or conical cap $l$, beneath which are the radial wings $m$, that act as fans, to produce a commotion of the air near the opening of the churn, and, by the centrifugal action, prevent any foreign substance falling into the churn.

Within the churn, and around the spindle $d$, is the splash-catcher $n$, and from the bottom of this catcher $n$ the hollow arms $o\ o$ extend downward and outward, and are formed with inclined ends, as seen at 4, so that the arms, as revolved, form the dasher, and the air is drawn down through these arms $o\ o$, and escapes among the milk or cream, causing the more rapid formation of butter, and any milk or cream that otherwise might be thrown, by the ebullition and agitation, out of the churn, is caught in the splash-catcher $n$, and runs back through the arms $o$.

What I claim, and desire to secure by Letters Patent, is—

The splash-catcher $n$, and arms $o$, formed with slanting ends, and revolved with and by the spindle $d$, in combination with the cap $l$, and wings $m$, as and for the purposes set forth.

In witness whereof, I have hereunto set my signature, this 29th day of June, A. D. 1869.

ADDISON MOE.

Witnesses:
F. M. BACON,
L. W. SERRELL.